United States Patent [19]

Panzer et al.

[11] E Re. 28,808

[45] Reissued May 11, 1976

[54] POLYQUATERNARY FLOCCULANTS

[75] Inventors: Hans Peter Panzer, Stamford, Conn.; Kenneth Wayne Dixon, Ypsilanti, Mich.

[73] Assignee: American Cyanamid Company, Stamford, Conn.

[22] Filed: Mar. 6, 1974

[21] Appl. No.: 448,599

Related U.S. Patent Documents

Reissue of:

[64] Patent No.: 3,738,945
Issued: June 12, 1973
Appl. No.: 223,622
Filed: Feb. 4, 1972

U.S. Applications:

[60] Divisional reissue of said Pat. No. 3,738,945, which is a continuation-in-part of Ser. No. 115,556, Feb. 16, 1971, abandoned. Re. 28,807 (Ser. No. 448,600) is also a divisional reissue of said Pat. No. 3,738,945.

[52] U.S. Cl. ..... 260/2 BP; 210/54; 260/2 EP; 260/29.2 EP

[51] Int. Cl.[2] ..... C08G 65/26; C02B 1/20

[58] Field of Search ..... 260/2 BP, 2 EP, 29.2 EP, 260/567.6 P; 210/54

[56] References Cited

UNITED STATES PATENTS

| | | | |
|---|---|---|---|
| 2,173,069 | 9/1939 | Ulrich et al. | 260/247 |
| 2,753,372 | 7/1956 | Lundberg | 260/501 |
| 3,240,721 | 3/1966 | Fordyce | 260/2 |
| 3,259,570 | 7/1966 | Priesing et al. | 210/53 |
| 3,493,502 | 2/1970 | Coscia | 210/54 |
| 3,567,659 | 3/1971 | Nagy | 260/2 |
| 3,663,461 | 5/1972 | Witt | 260/2 BP |

FOREIGN PATENTS OR APPLICATIONS

| | | |
|---|---|---|
| 1,111,144 | 7/1961 | Germany |

*Primary Examiner*—Donald E. Czaja
*Assistant Examiner*—E. A. Nielsen
*Attorney, Agent, or Firm*—William J. van Loo

[57] ABSTRACT

Polyquaternary flocculants of average molecular weight, in excess of 10,000 are prepared by reacting a secondary amine with an epihalohydrin or diepoxide for use in flocculation of aqueous systems where ordinary cationic flocculants cannot be used.

19 Claims, 1 Drawing Figure

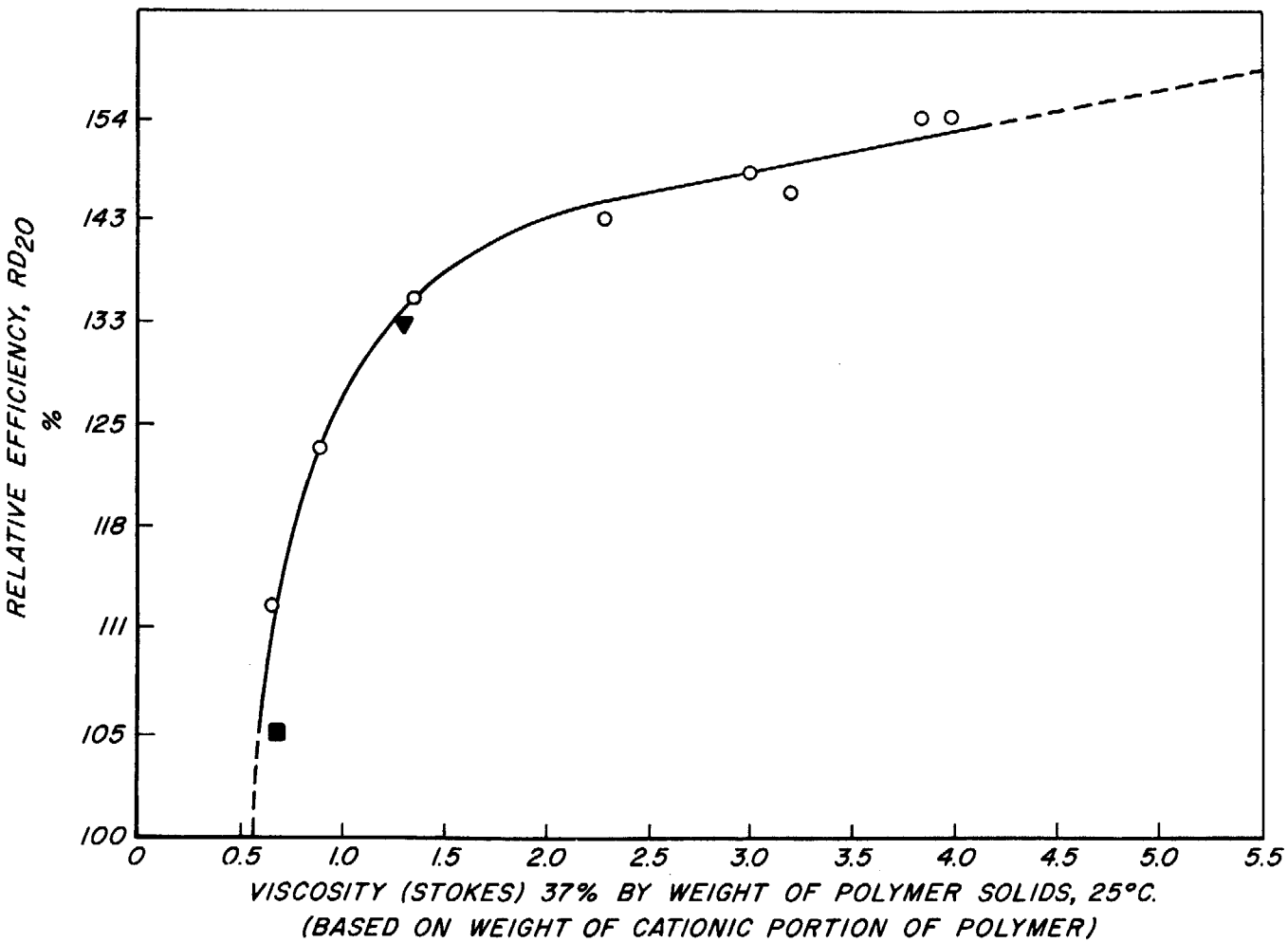
RELATIVE EFFICIENCY, RD20
%
154
143
133
125
118
111
105
100
0
0.5
1.0
1.5
2.0
2.5
3.0
3.5
4.0
4.5
5.0
5.5
VISCOSITY (STOKES) 37% BY WEIGHT OF POLYMER SOLIDS, 25°C.
(BASED ON WEIGHT OF CATIONIC PORTION OF POLYMER)

POLYQUATERNARY FLOCCULANTS

Matter enclosed in heavy brackets [ ] appears in the original patent but forms no part of this reissue specification; matter printed in italics indicates the additions made by reissue.

*This application is a divisional reissue of Ser. No. 223,622, filed Feb. 4, 1972, now U.S. Pat. No. 3,738,945, issued June 12, 1973, which* is a continuation-in-part of co-pending application Ser. No. 115,556, filed Feb. 16, 1971, now abandoned. *U.S. Pat. No. Re. 28,807 (Ser. No. 448,600) is also a divisional reissue of said U.S. Pat. No. 3,738,945.*

This invention relates to new polyquaternary compounds of high molecular weight and to the processes of preparation thereof. More particularly, the invention relates to polyquaternary compounds derived from major portions of dialkylamines and difunctional epoxide compounds or precursors thereof.

Flocculation of aqueous dispersions is an important operation. Throughout this application the term "aqueous dispersion" will be used in its broad sense of any system having at least two phases, one of which is a continuous outer aqueous phase regardless of whether the disperse phase or phases are suspensions of fine particles or much larger particles. In other words, the term will be used to cover systems from river water having small amounts of suspended solids on through industrial and municipal wastes, such as sewage, sewage sludge to be dewatered, and industrial product dispersions such as mashes from the fermentation processes for producing such materials as enzymes, and the like. The aqueous dispersions with which the present invention deals have disperse material which has a negative charge [; and in the case of clarification of river water, for example for producing drinking water or industrial water, there is often, chlorine present, which creates further problems].

In order to flocculate aqueous dispersions where the disperse phase has negative charges, it has been customary in the past to use materials such as alum, ferric salts, and the like which are transformed into the hydroxides or to use organic cationic flocculants, which neutralize the negative charge. Particularly with dispersions which have been chlorinated, flocculants of the present invention which are polyquaternary polymers, are important as they are not only useful with negatively charged particles but they also do not react with chlorine under conditions of use and become degraded, as is the case with certain other [cation] *cationic* flocculants.

Cationic flocculants are extensively used and sometimes even polyquaternary flocculants are used. However, as comparatively large amounts of the flocculants are often needed and as quaternary compounds can be fairly expensive, the cost of treatment is a serious economic factor, and there is a great deal of room for improvement which would permit using smaller amounts and/or cheaper products.

The physical properties that are responsible for effective performance of various flocculants are not precisely known and, therefore, are not predictable. There is no good correlation between property modifications that result in more effective performance with one flocculant type and those property modifications that result in more effective performance with another flocculant type. Although some physical properties are shared by certain effective flocculants, the effect of variation of individual properties thereof does not appear to have been investigated to any great extent nor do the results of limited investigations lead to any consistent conclusions.

U.S. Pat. No. 3,567,659, Nagy, Mar. 2, 1971, describes a cationic flocculant which is useful commercially. The first example of this patent is repeated below as Comparative Example A of this application and constitutes the standard flocculant against which the flocculants of the present invention are tested. This compound is in practical commercial use and constitutes one of the best presently available cationic flocculants. The polymer is of high viscosity in the form of aqueous solutions and is prepared so as to be close to and just short of the point of incipient gelation. Thus, in effect, the polymerization has been carried as far as is practical while still retaining a polymer that is of sufficient water solubility or dispersibility to be useful as a flocculant. Further increases in viscosity of the aqueous solution lead to gelation or poor stability before gelation occurs with the consequent loss of water solubility and dispersibility. Although there is some increase in flocculating efficiency of the polymer as molecular weight increases, reflected in viscosity increases of aqueous solutions, any increase in efficiency is accompanied by the threat of gelation and consequent loss of product usefulness. Thus, although this patent teaches highly effective flocculants, the limit of effectiveness is reached with the cationic polymers at or about the point where increases in molecular weight or solution viscosity lead to gelation and insolubility and consequent lack of suitability as flocculants.

Recent studies have shown that when the polymers obtained by the U.S. patent cited above are subsequently quaternized, the quaternary polymers obtained are good flocculants for aqueous dispersions having dispersed material with negative charges, i.e. for the same uses as the products of the present invention. The products obtained, however, have a branched polymer chain structure due to the polyfunctionality of methylamine during polymer formation. The reaction product of dimethylamine and difunctional epoxy compound, or precursor therefor, on the other hand, can produce only a completely linear structure in the resulting polyquaternary compound. Subsequent quaternization of the cationic products of the U.S. patent cited above results in considerable reduction of the solution viscosity thereof at equivalent polymer contents. This result may be due to a reduction in molecular weight of the original polymer formed or a product of different rheological properties.

German Auslegeschrift 1,111,144, July 20, 1961, produces a polyquaternary by reacting dimethylamine with epichlorohydrin. The product is obtained by a cold reactant addition stage in a dilute aqueous medium followed by a staged heating procedure and is described as a treating agent for dyed materials or as a dyeing assistant. No suggestion of use as a flocculant is made. The products are of low molecular weight as reflected in a viscosity when measured on the Gardner-Holdt scale at 25° C. and at 37% solids, by weight, based on the cationic portion of the polyquaternary compound, of 70 centistokes or less. While subsequent evaluation of the products as flocculants, as reported in Comparative Example B of this application, has shown some efficiency, the efficiency is considerably less than the polyquaternaries of the present invention and such evaluation was not suggested in the publication cited. The inventors of the German Auslegeschrift apparently were unaware of methods of increasing molecular weight of the polymer and, since the polymers they obtained were satisfactory for the use intended, were content not to go beyond the extent of polymerization actually achieved. Consequently, the products of the German Auslegeschrift cited above, although not suggested for use as flocculants therein, are, in fact, at most only slightly better than the products of U.S. Pat. No. 3,567,659 when evaluated as river water flocculants.

U.S. Pat. No. 2,454,547, Bock et al., Nov. 23, 1948, discloses preparation of polyquaternary compounds by reaction of secondary amines with epichlorohydrin. The compounds obtained are surface active and of such low molecular weight as not to be considered for use as flocculants. The compounds are prepared by use of expensive solvents, which use increases product costs and requires additional processing steps for solvent recovery.

U.S. Pat. No. 3,259,570 discloses a polymer prepared from equimolar quantities of epichlorohydrin and dimethylamine and in addition 13% by weight of tetraethylenepentamine. [The polymer thus produced is not within the scope of the present invention, because the quantity of epichlorohydrin is exceedingly low to make possible the formation of polymers which are contemplated by means of the present invention.] *The method of preparation is not given, however, performance data shown in the references indicate a polymer of low molecular weight.*

[In accordance with a first product aspect of the present invention, there is provided a water-dispersible polyquaternary compound consisting essentially of the repeating units

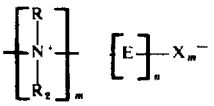

wherein R and $R_2$ are individually selected from the group consisting of alkyl of 1 to 3 carbon atoms; E is the residue obtained after bifunctional reaction of a compound selected from the group consisting of epihalohydrins, diepoxides, precursors for epihalohydrins and diepoxides, and mixtures thereof; m and n are integers of substantially the same value, the combination of which is such as to provide a polyquaternary compound which as a 37% aqueous solution, by weight, based on the total weight of the cationic portion of said polyquaternary compound, has a viscosity at 25° C. of at least 100 centistokes; and $X^-$ represents an ion forming the anionic portion of said polyquaternary compound.]

[This product aspect of the present invention, as is apparent, involves two specific reactants only, a lower dialkylamine and a difunctional epoxy type reactant. The polyquaternary compound differs from prior art products in several significant aspects. Compared with polyquaternaries which are obtained by first preparing a polymer from a primary amine and an epoxy compound and subsequently quaternizing the resulting polymer, the polyquaternary compounds of the present invention are essentially linear in structure and not influenced in molecular configuration by intermediate preparation. Compared to polyquaternary compounds obtained by reaction of secondary amines with epichlorohydrin under prior art reaction conditions, the present compounds are much higher in solution viscosity at comparable solid concentrations and provide outstandingly superior efficiency in uses such as in river water flocculation. It is believed that the higher solution viscosities of the present compounds stem from the fact that in their preparation those conditions, i.e. excessive water usage, which lead to premature termination of growing polymer chains, i.e. by cyclization and hydrolysis are avoided.]

In accordance with [a second] *the* product aspect of the invention, there is provided a water-dispersible polyquaternary compound consisting essentially of the repeating units

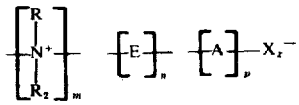

wherein R and $R_2$ are individually selected from the group consisting of alkyls of 1 to 3 carbon atoms; E is the residue obtained after bifunctional reaction of a compound selected from the group consisting of epichalohydrins, diepoxides, precursors for epihalohydrins and diepoxides, and mixtures thereof; A is the residue obtained after bifunctional reaction of a polyfunctional polyamine selected from the group consisting of ammonia, primary amines, alkylene diamines of 2 to 6 carbon atoms, polyalkylpolyamines of the structure

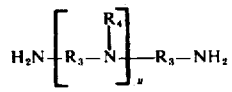

wherein y represents an integer of about 1 to 5, $R_3$ is an alkylene radical of about 2 to 6 carbon atoms, and $R_4$ is selected from the group consisting of hydrogen, alkyl of about 1 to 3 carbon atoms, and ω-aminoalkyls of about 2 to 6 carbon atoms, a polyglycolamine of a structure such as

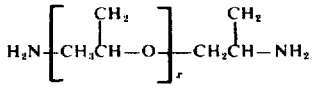

wherein x is an integer of about 1 to 5, piperazine heteroaromatic diamines of the structure

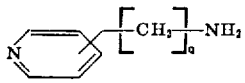

wherein q is zero or an integer of about 1 to 3, aromatic diamines of the structure

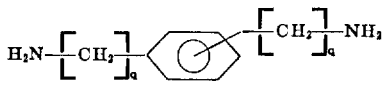

wherein q is zero or an integer of about 1 to 3, and polyamine-polybasic acid condensation products of molecular weight up to about 10,000; $X^-$ is an ion forming the anionic portion of said polyquaternary compound; m and p are integers which represent the molar quantities of amine reactants, the ratio of m to p being from about 99:1 to 85:15; n represents the molar quantity of E forming the principal chain of said polyquaternary, the molar quantity represented by n being substantially equal to the sum of the molar quantities of m and p; said polyfunctional amine containing in addition to the amount of E required for difunctional reaction therewith an amount of E which is from zero to about the full functional equivalency remaining in said A; the sum of m, n and p being such as to provide a polyquaternary compound which as a 37% aqueous solution, by weight, based on the total weight of the cationic portion of said polyquaternary has a viscosity at 25° C. of at least [10] = *100* centistokes; and Z is an integer such as to satisfy anion requirements of said polyquaternary compound.

[This second] *The* product aspect, as far as is known, represents novel polyquaternary compounds. In addition to outstanding performance as flocculants, these polyquaternaries have a widely diversified range of utility, highly unexpected in a single type of polymer compound in view of prior art compound. The polymers [of the second product aspect] are operative in flocculant operations wherein [most] other cationic flocculants fail. The process of preparation, discussed below, involves direct reaction to polyquaternary compounds and may involve subsequent modification to increase content of quaternary nitrogen groups.

[In accordance with the process aspect of the invention corresponding to the first product aspect, there is provided a process for preparing a polyquaternary compound from a secondary amine selected from the group consisting of dialkylamines wherein the alkyl groups are individually selected from those containing 1 to 3 carbon atoms and an epoxy compound selected from the group consisting of epihalohydrins, diepoxides, precursors for epihalohydrins and diepoxides, and mixtures thereof which process comprises the steps of (1) preparing an aqueous reaction mixture of one of said reactants, the amount of water present being from about 10% to about 55% by weight, based on the total weight of reactants and water, (2) adding the other of said reactants to the reaction mixture at a rate which maintains the reaction mixture at a temperature in the range of about 20° to 70° C., the total amount of reactants employed being substantially equimolar, (c) heating the reaction mixture thus obtained at a temperature in the range of about 40° to 70° C. for a time period sufficient to obtain a polyquaternary which as a 37% aqueous solution, by weight, based on the total weight of the cationic portion of the polyquaternary compound has a viscosity at 25° C. of at least 100 centistokes, and thereafter recovering the polyquaternary compound thus formed.]

In accordance with the process aspect of the invention [corresponding to the second product aspect,] there is provided a process for preparing a polyquaternary compound from a first reactant selected from the group consisting of dialkylamines wherein the alkyl groups are individually selected from those containing 1 to 3 carbon atoms; a second reactant selected from the group consisting of ammonia, primary amines, alkylenediamines of about 2 to 6 carbon atoms, polyamines of the structure

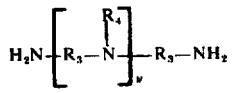

wherein y represents an integer of about 1 to 5, $R_3$ is an alkylene of about 2 to 6 carbon atoms, and $R_4$ is selected from the group consisting of hydrogen, alkyl of about 1 to 3 carbon atoms, and ω-aminoalkyls of about 2 to 6 carbon atoms, a polyglycolamine of a structure such as

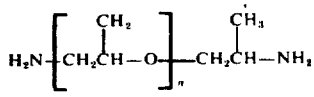

wherein a is an integer of about 1 to 5, piperazine, heteroaromatic diamines of the structure

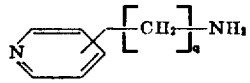

wherein q is zero or an integer of about 1 to 3, aromatic diamines of the structure

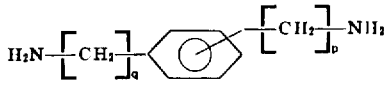

wherein p and q individually are selected from zero and integers of about 1 to 3 and polyamine-polybasic acid condensation products of molecular weight up to about 10,000: and a third reactant selected from the group consisting of epihalohydrins, diepoxides, percursors for epihalohydrins and diepoxides, and mixtures thereof, the molar quantity of said first and said second reactants being such as to provide a ratio of 99:1 to 85:15, respectively, and the molar quantity of said third reactant being an amount which ranges from substantially equimolar to the total molar quantities of amines employed substantially equal to the total functionality requirements of the amines; which process comprises (a) forming an aqueous reaction of said reactants while maintaining the reaction mixture at a temperature in the range of about 20° C. to about 100° C., the amount of water in said mixture being from about 10% to about 55%, by weight, based on the total weight of reactants and water; (b) maintaining said reaction mixture at a temperature in the range of about 50° to 100° C. until a polyquaternary is obtained which as a 37% aqueous solution, by weight, based on the total weight of the cationic portion of said polyquaternary compound has a viscosity at 25° C. of at least [10] *100* centistokes, and thereafter recovering said polyquaternary compound.

The products of the present invention are superior flocculants [to those of the prior art, being at least 125% more efficient in flocculating river water than the best prior art flocculants. In other applications, such as in treatment of sewage sludges, the products of the second product aspect of the invention have vastly superior flocculating efficiency, being useful under conditions where other flocculants fail completely.] Their improved efficiency enables greater flocculation to be achieved at a given usage level and equal flocculation to be achieved at lower active usage than *certain* conventional flocculants both aspects resulting in significant advances in the art and greatly economizing processes of flocculation. Products of the invention have many additional uses besides those of flocculation. Although certain other flocculants have a limited number of additional uses, the wide versatility in effective uses of present compounds has never previously been demonstrated by a single specific polyquaternary type, as far as is known. This versatility of utility of present compounds reduces greatly the number of compound types that are needed for specific applications and thus reduces the need to prepare and inventory specific compounds for specific utilities. The more efficient performance of the present compounds also reduces preparation and inventory requirements.

The process aspects of the present invention also offer advantages over prior art processes and provide advances in the art thereby. In the present invention polyquaternaries are produced directly from the starting reactants in a simple process, thus eliminating many steps and expensive solvents associated with former processes. The [ processes are ] *process is* readily carried out using a single reactor in a continuing manner, thus eliminating the need for multiple reactors and intermediate product isolation. The [ processes are ] *process is* carried out in a manner which minimizes time elapsed from inception to completion of the reactions and thus increases production capacity of a given reactor over a given time period. In spite of the various advantages of the [ processes, ] *process*, however, [ they ] *it* nevertheless [ provide ] *provides* polyquaternary compounds which are superior in performance in utilities such as flocculation and sludge dewatering, for example.

The polyquaternary compounds of the present process, being the result of a polymerization reaction, are not obtained as simple single substances. Instead the products are obtained as a mixture varying in molecular weight as to individual species. Complicating the characterization of the polymeric material is the fact that ionic polyquaternary compounds are involved and characterization is influenced by the anionic portions present. To avoid these various problems, viscosity of aqueous solutions of the polyquaternary compounds is determined at concentrations expressed in terms exclusive of the anionic portion thereof to characterize the polymers and this property is known to correlate well with molecular weight of polymers. Throughout the specification and claims, therefore, the viscosity measurement reported is measured at 25° C. in aqueous medium at 37% polymer solids, by weight, based on the total weight of the cationic portion of the polyquaternary compound, that is to say the polymeric material minus its associated anion.

In preparing the various products of the present invention epoxy type reactants are employed. Epihalohydrins are used and are intended to include epichlorohydrin and epibromohydrin, for example. Longer chain epihalohydrins may also be used. Epichlorohydrin is preferred both from economic and reactivity aspects. Diepoxides, such as 1,4-butanediol-diglycidyl ethers, a preferred diepoxide, are also useful. It is to be noted that epihalohydrins and diepoxides are bifunctional in reaction and this permits formation of essentially linear polymers in appropriate instances. Precursors for epihalohydrins and diepoxides are also useful. For example, 1,3-dichloropropanol-2, a precursor for epichlorohydrin, may be used. Similarly, 1,4-dichloro, 2,3-dihydroxybutane, the precursor for 1,3-butanediepoxide, may also be used. These precursors are readily converted into corresponding epoxy compounds under alkaline conditions and thus are generally employed under alkaline conditions in the present processes. Mixtures of the various epoxy type reactants may also be employed. In forming the principal polymer chain, the amount of epoxy type compound should be substantially equimolar in amount to the total molar amount of amine usage, viz., the dimethylamine and the polyamine employed. If this condition is not met, that is, the epoxy type reactant is less in amount, the polyamine will act as a chain termination, thus resulting in significantly lower molecular weight polymers. Controlled addition of reactants in forming the reaction mixture can also be employed as a means of influencing formation of the principal polymer chain. In preferred instances, subsequent to reaction of equimolar amounts of total amine and epoxy type reactants, additional increments of epoxy type reactant are added to react with unreacted functionalities of the polyamines, providing acceptable branching and additional quaternization, as well as cross-linking of separate molecular chains. If the epoxy type reactant is held below the minimum specified hereinabove, the reaction is terminated much sooner then is desired. The choice of relative amounts of epoxy type reactant and total amine contemplated by means of this invention leads to the formation of high molecular weight linear chains in the polymer backbone, with the desired branch or cross-linking sites. Additional reaction with epoxy type compound of unreacted amine functionalities also tends to diminish susceptibility of the polyquaternary compound to chlorine attack where present in specific utilities. In this respect, therefore, it is to be understood that usage of epoxy type compound can be up to the full equivalency of the amine reactants present, which can be much higher than equal molar quantity.

Secondary amines useful in the processes of the present invention include dimethylamine, preferred, diethylamine, dipropylamines, and secondary amines containing mixtures of alkyl groups having 1 to 3 carbon atoms. Secondary amines of higher carbon atom contents are generally sluggish in reaction due to steric effects of the substituents present therein. Thus, such amines not only require unduly long reaction times but may also interfere with quaternary formation. Mixtures of the amines recited above may also be employed. It is to be noted that secondary amines are bifunctional in reaction with the bifunctional epoxy type reactants, a first function provided by the hydrogen atom and a second function involving quaternization of the nitrogen atom. [ Where a secondary amine is the sole amine type employed in the preparation, the polymer obtained by use of difunctional epoxy type compound can only be linear in structure. ]

[ Where polyamines ] *Polyamines* are contemplated in the preparation of the polyquaternary compounds, [ they ] *and* should constitute at least about 1% but not more than about 15% of the total molar amount of amines in the reaction and more usually about 2 to 8% of the molar amount. Higher amounts lead to excessive chain branching and can adversely effect performance and solubility of the products. The specific content of polyamine that may be used will vary in individual instances depending primarily upon the total functionality of the polyamine considered. Thus, polyamines of very high functionality can generally only be used in smaller amounts while polyamines of low functionality can be used in greater amounts, within the general range specified. For example, a diamine having a functionality of 6 or more with respect to the epoxy type reactant cannot be used in amount greater than 8% on a molar basis based on the total molar amount of amines employed, whereas with a functionality of the polyamine less than 6, the amount thereof is greater than 8 mol percent of the total amine. The upper limit of usage of a polyamine is that amount which still provides a water-soluble product. Referring to ethylenediamine, for example, it should be noted that this amine is hexa-functional with respect to reaction with epoxy type compound, four functionalities provided by the two hydrogen atoms present on each amine group and two additional functionalities involving quaternization of each of the two nitrogen atoms. Not all of these functionalities are of equal reactivity and, consequently, possibilities for control of the reaction to some extent between chain formation, chain branching, and quaternization are provided. Amounts of polyamine below about 1 mole percent based on the total molar amount of amines employed generally do not have any significant effect on the properties of the polyquaternary compound and it is generally preferred to have at least 2 mole percent present, same basis.

Ammonia is polyfunctional in its reaction with an epoxy type reactant and may be employed as [ an equivalent to ] a polyamine. Primary amines are also useful and include a wide variety of aliphatic and aromatic species. The only requirements as to use of primary amine are that it possess sufficient reactivity with the epoxy type compound to exhibit polyfunctional reaction and that its use not result in water-insolubility of the polyquaternary. Preferred primary amines are lower alkyl amines wherein the alkyl groups contain up to about 3 carbon atoms.

Polyamines which may be employed include alkylenediamines of about 2 to about 6 carbon atoms such as ethylenediamine, propylenediamine, and hexamethylenediamine. Oligomers of alkylene diamines are obtained from still bottoms resulting from the purification of certain alkylenediamines for other industrial purposes, for example in the purification of hexamethylenediamine used extensively for producing various nylons. The still bottoms, although not readily characterized as to exact composition give excellent results in preferred embodiments of the present invention and, since they are byproducts, are quite economical. Polyalkylenepolyamines are also useful in the present process and include such compounds as diethylenetriamine, dipropylenetriamine, triethylenetetramine, pentaethylenehexamine, nitrilotris (propylamine), propylenediamine, N-methyl, N-propylamine, nitrilotris (ethylamine) and generally any compound of the following structure:

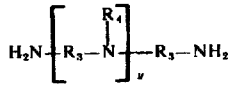

wherein y represents an integer of about 1 to 5, $R_3$ is an alkylene group of about 2 to 6 carbon atoms, and $R_4$ is selected from the group consisting of hydrogen, alkyl of about 1 to 3 carbon atoms, and ω-aminoalkyls of about 2 to 6 carbon atoms. In addition, other useful polyamines include polyglycolamines of a structure such as:

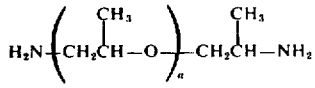

wherein a is an integer of about 1 to 5, heterocyclic aliphatic diamines such as piperazine, heteroaromatic diamines of the structure:

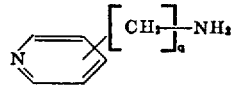

wherein q is zero or an integer of about 1 to 3, and aromatic diamines of the structure:

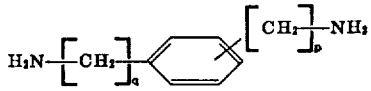

wherein p and q are individually zero or an integer of about 1 to 3.

Polyamine-polybasic -acid condensation products are obtained by condensing a polyfunctional amine with a polyfunctional acid using a slight excess of amine so as to provide an amine-terminated product. Such condensates are widely known, as are their preparative methods. Typically, one would condense an amine such as triethylenetetramine with an acid such as adipic acid using a slight excess of amine over an equimolar charge of reactants. The product obtained has the structure:

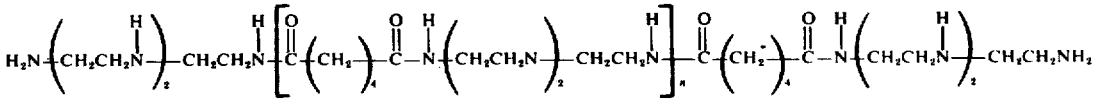

wherein n is an integer such as to indicate a polymer of a molecular weight up to about 10,000. Although the polymer contains amide linkages, it is terminated with amine groups and has additional amine functionality depending upon the number of amine groups in the polyamine employed. Although the condensation product is typified by triethylenetetramine and adipic acid, it is to be understood that other polyamines and polybasic acids, as is well known, may be employed in preparing the condensate.

In carrying out the reaction of epoxy type compounds solely with secondary amine, addition of the reactants may be in either order, i.e., the epoxy type compound may be added to the amine or the amine may be added to the epoxy type compound. Water is essential in preparing the reaction mixture and the amount of water present is critical. Generally, the amount of water present will be in the range of about 10% to about 55%, by weight, based on the total weight of reactants and water, and this is true in connection with a reaction mixture in which plural amines, i.e., the secondary amine and the polyamine are present. Absence of water presents problems in controlling the reaction and some water is necessary to effect radiation. The amount of water present also influences the degree of polymerization effected, as reflected in solution viscosity of the resulting polyquaternary compound, lower amounts of water resulting in polyquaternary compounds of higher solution viscosities at equal solids of the cationic portion of the polyquaternary compound. Thus, the ultimate degree of polymerization obtained in a given preparation will be influenced by the amount of water present in the reaction mixture, and for products of high solution viscosities in water at 37% solids, by weight, based on the total weight of the cationic portion of the polyquaternary, it is essential that the amount of water present in the reaction mixture be limited, as indicated, to avoid premature termination of the growing polymer chain by cyclization and hydrolysis occasioned by excessive water usage. In preferred instances, the amount of water present will be in the range of about 15 to 45% water, by weight, based on the total weight of reactants and water. In addition to water as the reaction medium, there may be used a water soluble alcohol in place of part of the water contemplated. It is generally preferred to use water alone, however, from an economic viewpoint. Another factor in considering the reaction is the quantity and type of polyamine. As the functionality of the polyamine increases, the amount to be used thereof is decreased in order to avoid untoward gelation and to obtain the desired high molecular weight polymer.

The reaction of an epoxy type compound with secondary amine, such as dimethylamine is exothermic, for example, the reaction of epichlorohydrin with dimethylamine is exothermic to the extent of about 40 kilocalories per mole of epichlorohydrin initially. Accordingly, some care should be exercised to control the temperature during preparation of the reaction mixture. Use of water, as described above, is helpful. In addition, the rate of addition of reactants should be such as to keep the temperature in the range of about 20° C. to about 70° C. when the two reactants specified are employed alone. The addition may be of secondary amine to epoxy type compound dispersed or dissolved in water, of secondary amine dissolved in water to epoxy type compound, of epoxy type compound to secondary amine dissolved in water, or any other suitable ramification of the additions recited.

After the reaction mixture has been obtained, the reaction should be allowed to proceed at a suitable temperature until a polyquaternary compound is obtained which, as a 37% aqueous solution by weight, based on the total solids of the cationic portion of the polyquaternary compound, has a viscosity of at least 100 centistokes. In general, higher temperatures permit somewhat more rapid reaction, but reaction of secondary amine and epoxy type compound is quite rapid at about 50° C. and so temperatures from about 40° C. to 70° C. constitute a preferred practical range. High viscosities, i.e., in excess of 200 centistokes, under the same conditions of measurement, are possible since polyquaternary compounds are water soluble even at very high viscosities. Once the polyquaternary compound exhibits the desired viscosity, it is recovered. "Recovered" as that term is employed throughout the specification and claims, means that the reaction mixture is cooled, diluted, if desired, adjusted in pH, if necessary, and removed from the reactor. In most instances, high solution concentrations are desirable in the product since they minimize freight charges per unit weight of real product. However, in some instances, such as where extremely high viscosities are obtained, it may be desirable to dilute the reaction product to facilitate handling. Adjustment of the pH may also desirable. It is generally preferable to store the polyquaternary product at a pH below about 5.5. Higher pH values in some instances tend to permit continuing reaction to occur, which could lead to gelation or difficulties in handling of the product.

The term "solution," as that term is employed in the present specification and claims means a homogeneous mixture, including mixtures that are microscopically homogeneous as well as those which are macroscopically homogeneous but microscopically heterogeneous, such as in the case of colloidal solutions. It is readily appreciated that polymeric materials of high molecular weight, although completely water dispersible to form a homogeneous mixture, nevertheless generally exhibit the Tyndall effect when dispersed in water and thus qualify as a colloidal solution. The nature of the particular polymer solution does not adversely affect performance of the polymer and due to increased efficiency with increasing molecular weight, as reflected by viscosity, solutions of colloidal nature are, in fact, highly desirable.

When producing polyquaternary compounds from both secondary amines and polyamines by reaction with epoxy type compounds, the [same] general procedures recited above are employed, except for three modifications that arise from the presence of polyamine. One modification is the use in some instances of additional amounts of epoxy type reactant due to the increased functionality of polyamine over secondary amines. A second modification is the use of a wider temperature range which also results from the increased functionality of polyamines. The third modification results from the use of two different amines and the added variations in addition of reactants that are possible. In general, the use of polyamine gives rise to the possibility of using amounts of epoxy type reactant that are not only equimolar to the total molar amounts of amines employed, but also gives rise to the use in some instances of amounts of epoxy type reactant that are equivalent to the total functionalities of the amines employed. When use of epoxy type reactant substantially equal to the total equivalency of the amines is contemplated, additional precaution should be considered with respect to the reaction since loss of water dispersibility can occur rapidly at later stages of reaction. Temperatures in the range of about 20° C. to 100° C. are reached during formation of the reaction mixture and the use of a temperature in the range of about 50° C to 100° C. is contemplated during later stages of the reaction. The use of two different amines coupled with the use of added epoxy type compound gives rise to an additional number of variations in the order of addition of reactants and the manner in which added epoxy type compound is employed.

There are, in general, two preferred variants employed in use of the two amine types in the reaction. In a first preferred variant, the secondary amine and epoxy type reactant are first reacted to a substantial degree, i.e., from about 50% to about 80% of the reaction potential, in aqueous medium. In forming the reaction mixture, reactants may be added in either order and the temperature is maintained in the range of about 20–100° C., preferably 20–70° C. After the desired degree of reaction has been obtained, the polyamine is added and the reaction maintained in the range of about 50–100° C. until a polyquaternary compound is obtained which as a 37% aqueous solution, by weight, based on the weight of the cationic portion of the polyquaternary compound, has a viscosity of 25° C. of [ at least 10 centistokes, preferably ] at least 100 centistokes. The polyquaternary compound is then recovered, as indicated above.

In a second preferred variant, the secondary amine and polyamine are mixed and reacted with the epoxy type reactant in aqueous medium. Addition of reactants may be in any order and in preparing the reaction mixture, the temperature is maintained in the range of 20–100° C. After the mixture is formed, it is held at a temperature in the range of 50–100° C. until a viscosity as in the first variant is obtained and the polyquaternary compound is then recovered.

In either of the two variants just described, the total usage of epoxy type reactant may be added during preparation of the reaction mixture. A preferred procedure, however is to add an amount of epoxy type reactant which is about equimolar to the total amount of amines employed in preparing the reaction mixture and subsequently adding the additional epoxy type reactant in increments up to the level of usage contemplated. In this method of addition, each increment of epoxy type reactant is allowed to react prior to addition of further increments. This method of addition allows very high viscosities to be achieved in a relatively safe manner.

While the range of viscosities; and hence molecular weights, of compounds of the present invention are quite broad, nevertheless they are all of high molecular weight. For best performance efficiencies, particularly where the products are from the three reactants, viscosities of 200 centistokes and more are highly desirable as will be seen in the curve of the drawing. There is essentially no significant upper limit on molecular weight except that the polyquaternaries must be water dispersible and preferably water soluble to an extent useful in applications without unduly high viscosity. Products having viscosities as high as 800 or 17,000 centistokes can be used. It will be seen from the curve of the drawing, which deals with clarification of river water, that the increase in efficiency with rising molecular weight is at first quite large and gradually diminishes as molecular weight increases. Thus, the slightly increased performance efficiency of the very high molecular weight products does not offset the risk (possibility of gelation) involved in making them.

The amount of a particular polymer which is to be used depends on the nature of the aqueous dispersion in which it is to be used. Relatively small amounts can be used for the clarification of river water containing suspended solids, such as, for example colloidal clays. This is one of the most important practical fields of the present invention, and while the amounts of flocculants needed are very moderate and less than with prior art flocculants, the volume of aqueous dispersion treated can be so enormous that this field can require very large quantities of the polyquaternary compounds of the present invention. Aqueous dispersions such as enzyme mashes, ilmenite digestion liquors, paper making wastes, sewage and dewatering of sewage sludge, represent dispersions having a much higher content of the disperse phase, and the flocculation of such dispersions requires larger amounts of flocculant, but the increased efficiency of the products of the present invention [ as compared with currently used cationic flocculants ] still hold. It should be noted that the disperse phase is not necessarily a single kind of solid. For example, in sewage sludge the disperse phase may be gels with quite large particle size, much larger than the fine suspension of solids in the case of clarification of various waters.

Efficiency tests, which are measured relative to the cationic flocculant described in Comparative Example A below, are carried out as follows:

A suspension of kaolin clay with negative charges on the particles in water is used as a standard test medium as this closely approaches many river waters. A stock suspension of clay is made by mixing 25 grams of kaolin in a liter of deionized water for 24 hours and then allowing settling in a graduated cylinder for 24 hours. The upper portion is decanted, such that the particle size of this fraction is not substantially in excess of $2\mu$. This concentration is then diluted with water to yield a test water containing 70 p.p.m. of kaolin. One liter samples of the test water are placed in a six-place laboratory stirrer and varying amounts of the standard compound diluted to 30 ml. added, mixing being maintained at 100 r.p.m. for one minute. This is followed by flocculation at 40 r.p.m. for 15 minutes and settling for 15 minutes. The supernatant liquid is drawn off and analyzed for residual turbidity and electrophoretic mobility. The turbidites are plotted and the dosage taken where the turbidity is 20% of that for the untreated water. A similar series of tests is run on the sample of the product of interest and the relative dosage compared to the standard is calculated. The dosage is that quantity of flocculant needed to produce a turbidity which is 20% of that of the untreated water and varies with the different flocculants. The dosage of standard flocculant divided by the dosage required of the flocculant of interest and multiplied by 100 represents the relative efficiency of the product of interest at a dosage level, producing the turbidity of 20% of the untreated water $RD_{20}$.

The sole FIGURE is a curve resulting from plotting the relative efficiencies of polyquaternary flocculants against viscosity of aqueous solutions thereof, viscosities being at 25° C. of solutions containing 37% solids, by weight, of the cationic portion of the polyquaternary compounds.

In all of the examples which follow, the parts are by weight unless otherwise specified and the water is deionized water. Also, where solids or polymer solids is referred to, it is by weight, based on the weight of the cationic portion of the polyquaternary and not the total weight of the polymer including anion.

COMPARATIVE EXAMPLE A

To 100 g. of methylamine (3.25 mols) dissolved in 400 g. of water in a reaction flask provided with stirrer, thermometer and reflux condenser is added 260 g. of epichlorohydrin (2.8 mols, equivalent to 0.87 mol per mol of amine) over 60 minutes, cooling (by ice bath) being applied as necessary to keep the temperature of the reaction mixture between 25° C.–40° C. at the first half of the reaction and at 50° C.–80° C. during the second half of the reaction. 160 g. of 36% aqueous sodium hydroxide solution (1.44 mol) at 85° C. is then added to the reaction mixture. The reaction mixture is then heated to 95° C. and epichlorohydrin is added in 1 ml. (1/214 mol) portions and the viscosity of the reaction mixture is followed by filling a 6 mm. (inside diameter) vertical glass tube with the hot solution and noting the number of seconds required for the level of the solution to fall 13 inches when the bottom of the tube is opened. Results are as follows:

| Time (minutes)[1] | Ml. epi. added | Temperature (°C.) | Viscosity (seconds)[2] |
|---|---|---|---|
| 110 | 1 | 95 | 4 |
| 115 | 1 | 95 | 5.5 |
| 123 | 1 | 95 | 10.0 |

[1]From start to reaction
[2]Of reaction mixture, by glass tube method.

After 132 minutes, the reaction mixture becomes very viscous and the viscosity continues to rise. There is then added 274 g. of cold water containing 0.8 ml. of methylamine as reaction terminator, and the reaction mixture is heated to 94° C. The following viscosity changes occur:

| Time (minutes)[1] | Temperature (°C.) | Viscosity (seconds)[2] |
|---|---|---|
| 157 | 94 | 48 |
| 220 | 94 | 90 |
| 250 | 94 | 120 |
| 310 | 94 | 136 |
| 345 | 94 | 125 |
| 605 | 94 | 60 |

[1]From start of reaction.
[2]Of reaction mixture, by glass tube method.

The reaction mixture, which has a pH of 8.7, is cooled, acidified to pH 6.3, and diluted with water. The product contains 19.3% polymer and has a viscosity of 900 centipoises at 20° C.

The solution is stable indefinitely at 70° F. and 135° F. both at pH 8.7 and 4.5.

EXAMPLE 1

A 500 ml. round bottom flask was equipped with condenser, mechanical stirrer, thermometer, addition funnel, and pH electrodes. To the flask were added 92.5 grams (1.0 mole) epichlorohydrin. To the addition funnel were added 112.5 grams of 40% aqueous dimethylamine (45.0 grams real, 1.0 mole). The amine solution was added to the epichlorohydrin with vigorous stirring over a period of one hour, keeping the temperature in the range of 20–33° C. The clear solution resulting, containing 67% total polymer solids, was heated to 50° C. and held at that temperature for 6 hours. The product was then diluted to 37% solids with water and the viscosity determined to be 130 centistokes at 25° C. This value is represented by the triangle on the curve of the drawing. The product showed an efficiency of 135% relative to the product of Comparative Example A. On the same Curve, the performance of the product of the German Auslegeschrift is represented as a square. The product, the preparation of which is described in Comparative Example B below, has a viscosity of 70 centistokes and an efficency of 106% relative to the product of Comparative Example A. The efficiency of the product of the German Auslegeschrift is only 79% of that of Example 1. In other words, 1.3 parts of the product of the German Auslegeschrift is required to accomplish the same result as is obtained with 1 part of the product of Example 1. The solid portions of the curve of the drawing represent various efficiencies determined with polyquaternary compounds of the viscosities indicated. The dashed portions of the curve represent curve slope continuations beyond the actual range of study.

EXAMPLE 2

To a flask equipped as above were added 76.28 g. deionized water and 92.53 g. epichlorohydrin (1.0 mole) to give an emulsion on stirring. To the addition funnel were added 107.09 g. 40% aqueous dimethylamine (42.84 g., 0.95 mole) of 5.16 g. diethylenetriamine (0.05 mole). The amine solution was added to the epichlorohydrin emulsion over one hour, keeping the temperature between 20° C. and 31° C. After 30 minutes the clear solution was heated to 50° C. for 1½ hours.

The solution was then heated to 90° C. and 20 ml. of 50% potassium carbonate solution was added. The viscosity of the solution was increased by incremental additions of epichlorohydrin. Initially, 5 ml. of epichlorohydrin was added, followed by 2 ml. after 20 minutes, 1.5 ml. after an additional 15 minutes. 1.0 ml. after another 18 minutes and finally, 0.5 ml. after 27 minutes. To the viscous yellow solution was added 50 g. deionized water. The product has a viscosity of 800 centistokes at a dilution of 30% solids of the cationic portion of the polymer.

EXAMPLE 3

In this example the addition of reagents is reversed. 78.25 parts of water, 107.09 parts of 42% dimethylamine, and 3.0 parts of ethylenediamine were introduced into a stirred reactor provided with a cooling jacket. 92.53 parts of epichlorohydrin were then gradually added over a period of three hours at a rate keeping the temperature below 50° C. After all of the epichlorohydrin had been added, the clear solution was heated up to 90° C. for 30 minutes, and 6 parts of 50% aqueous sodium hydroxide solution gradually added.

The viscosity of the solution was advanced by incremental additions of epichlorohydrin. Initially, 2 ml. of epichlorhydrin were added, followed by 2 ml. more after 20 minutes and 1 ml. after a further 30 minutes. The reaction mixture was kept at 90° C. for one more hour.

Viscousity readings were taken as the reaction proceeded, and each sample was tested for flocculating efficiency by the method described above. The results are shown by the curve in the drawing, the points being circles, which showed that the efficiency increased with increasing viscosity.

The final product has a viscosity of 285 centistokes at 25° C. and at 37% solids, based on the cationic portion of the polyquaternary compound.

EXAMPLE 4

197 pounds of water are introduced into a 100-gallon glass-lined reactor with a variable speed agitator and a reflux condenser. The charge port is then closed and the agitator turned on and the reflux condenser supplied with cooling water. 239 pounds of epichlorohydrin were introduced, using an additional 30 pounds of water to flush the epichlorohydrin in the lines into the reactor. 290 pounds of 42% aqueous dimethylamine and 8.1 pounds of ethylenediamine were mixed. 284 pounds of the mixed amines were then added gradually to the reactor containing the epichlorhydrin at the initial rate of about one pound per minute. The addition takes 6 hours. The feed rate is controlled so that the reaction temperature is in the range of 30° to 35° C.

After all the amine has been added, temperature is raised to 50° C. and maintained for 2 hours. Then the reactor is heated to 90° C. with atmospheric steam, using tempered water as the top temperature is reached. When the temperature reaches 80° C., 15.4 pounds of 50% aqueous solution hydroxide is introduced. After thorough mixing, about 5 minutes, the agitator is shut off and viscosity determined periodically with a No. 4 Ford cup viscosimeter. 7.7 pounds of epichlorohydrin is then added, followed by an additional 7.7 pounds after 40 minutes, 6.2 pounds at 65 minutes, 6.2 pounds at 125 minutes, 6 pounds at 160 minutes and 5 pounds at 195 minutes. After the viscosity is stable the batch is cooled to 25°–30° C. The viscosity at 37% solids of the cationic portion of the polymer was 100 centistokes.

COMPARATIVE EXAMPLE B

The product of the German Auslegeschrift 1,111,114 was prepared as follows: 45 gm. of dimethylamine in the form of a 40% aqueous solution was introduced dropwise at a temperature of 0° to 5° C. into an emulsion of 92.5 gr. epichlorohydrin in 150 cc. of water, vigorous agitation was maintained. The reaction solution containing 38.8% total polymer solids was stirred for 6 hours at 15°–20° C. The reaction mixture, which then was still alkaline, was heated for 2 hours at 30°–35° C., and then 3 hours at 55°–60° C., and finally, 3.5 hours at 80°–85° C. The clear solution then showed a neutral pH. The viscosity at 37% solids of the cationic portion of the polymer was 70 centistokes.

The product was tested and the flocculation efficiency is shown by the square on the drawing. This represented about 106% of the standard compound as compared with 135% for the product of Example 1, while products of the present invention with increasing viscosity reach an efficiency of 156%, as shown in Example 3.

EXAMPLE 5

To a 500 ml. flask equipped as before were added 101.98 g. of 42% dimethylamine (42.83 g., 0.95 mole), and 10.77 g. of the oligomers of hexamethylene diamine obtained from the still bottoms of the purification of this product and sold by the Dupont Company under the designation Dupont Amine 248 (0.05 mole) and 82.35 g. deionized water. The addition funnel was charged with 87.90 g. epichlorohydrin (0.95 mole). The epichlorohydrin was added over 2.7 hours, keeping the temperature in the range of 40°–52° C. After two hours the brown solution was then heated to 90° C. and 6.0 g. of a 50% by weight aqueous sodium hydroxide solution was added together with 2 ml. epichlorhydrin. The viscosity was increased further by addition of 2 mole ml. epichlorohydrin after 15 minutes and, finally, 1 ml. after an additional 30 minutes. After heating at 90° C. for 45 minutes more, 75 g. water was added to the product. The viscosity at 30.5% solids of the cationic portion of the polymer was 235 centistokes.

EXAMPLE 6

To a 500 ml. flask equipped as before were added 107.1 g. 42% dimethylamine (44.98 g., 1.00 mole), 10.0 g. ethylenediamine still bottoms, sold by the Jefferson Chemical Company under their trade name "Polyamine PA-500" (0.05 mole), and 78.25 g. water. To the addition funnel was charged 92.5 g. epichlorohydrin (1.0 mole). The epichlorohydrin was added over 3 hours, keeping the temperature in the range of 20°–50° C. The brown solution was heated to 90° C. and 6.0 g. of a 50% by weight aqueous sodium hydroxide solution was added. After 30 minutes, 0.5 ml. of epichlorohydrin was added, followed by another 0.5 ml. after 45 minutes and another 0.5 ml. of epichlorohydrin was added, followed by 0.5 ml. after 30 minutes. The product became very thick and was diluted with 200 g. water. The viscosity at 20% solids of the cationic portion of the polyquaternary compound was 125 centistokes.

[EXAMPLE 7]

[To a 500 ml. flask equipped as before were added 50.9 g. 42% dimethylamine (21.38 g., 0.475 mole), 1.50 g. ethylenediamine (0.025 mole) and 39.6 g. deionixed water. To the addition funnel was added 101 g. of 1,4-butanediol-diglycidylether (0.5 mole), the diepoxide was added over 3 hours keeping the temperature in the range of 30°–55° C. The solution was heated to 90° C. and 1 ml. of the diepoxide was added. The viscosity was further increased by adding successive 1 ml. increments after 45, 75, 95, 165, 210 and 240 minutes. The viscosity at 65.4% solids of the cationic portion of the polymer was 800 centistokes. At 37% solids based on the cationic portion of polyquaternary compound the viscosity was 63 centistokes.]

[EXAMPLE 8]

[To a 500 ml. flask equipped as before was added 138.53 g. epichlorohydrin (1.5 moles). To the addition funnel was added 112.75 g. 60% aqueous dimethylaminei (67.64 g. 1.5 mole). The dimethylamine solution was added over 14 hours keeping the temperature at 20°–30° C. The viscous product containing 82.2% total polymer solids was then heated to 50° C. for 6 hours. On dilution to 37% solids of the cationic portion of the polymer, the product had a viscosity of 235 centistokes. A comparison of Example 1 and 8 with Comparative Example B indicates the increased viscosity obtainable with increased solids of the reaction mixture.]

EXAMPLE 9

To a 500 ml. flask equipped as before were added 107.1 g. 42% dimethylamine (44.98 g., 0.998 mole), 7.86 g. imino-bis-propylamine (0.06 mole) and 78.25 g. water. To the addition funnel was added 92.53 g. epichlorohydrin (1.0 mole). The epichlorohydrin was added over 2.7 hours keeping the temperature 30°–55° C. The solution was heated to 90° C. and 6 g. 50% by weight of a sodium hydroxide solution was added. The solution became very viscous and 150 ml. water was added. Epichlorohydrin, 0.2 ml., was added and the product became even more viscous. More water, 634 g., was added to give a product of 140 centistokes at 10.2% solids of the cationic portion of the polymer.

EXAMPLE 10

To a 500 ml. flask equipped as before is added 50.9 g. of 42% dimethylamine (21.38 grams real, 0.475 mole) and 39.6 g. deionized water. To the addition funnel is added 101 grams of 1,4-butanediol-diglycidyl ether (0.5 mole). The diepoxide is added over 3 hours maintaining the temperature in the range of 30°–55° C. After completion of the addition the reaction mixture is heated to 90° C. and analysis indicates reaction to be about 75% complete. 1.50 grams (0.025 mole) of ethylenediamine is added and the reaction temperature is maintained for an additional 2 hours. A polyquaternary compound is obtained which as a 37% aqueous solution, by weight, based on the weight of the cationic portion of the polyquaternary compound has a viscosity of 125 centistokes at 25° C.

EXAMPLE 11

To a 500 ml. flask equipped as before were added 207.5 grams of a prepolymer of adipic acid and triethylenetetramine as a 37.4% aqueous solution (77.6 grams real, about 0.04 mole) and 27.4 grams aqueous dimethylamine solution (59.15%, 16.2 grams real, 0.36 mole). To the addition funnel was added 34.4 grams of epichlorohydrin (0.372 mole). The addition was carried out while maintaining the temperature of the reaction mixture in the range of 20°–40° C. over a period of 3 hours. The solution was then heated to 90° C. and maintained thereat until no further increase in viscosity was noted. Over a period of about one hour there was then added 0.9 ml. of epichlorohydrin and reaction continued until no further increased in viscosity was noted. There was then added 1.2 grams of 50% aqueous NaOH and an additional increment of 0.9 ml. of epichlorohydrin was added over a 5 hour time period. The reaction mixture was then diluted to 35% solids and the reaction advanced with an additional increment of 0.2 ml. of epichlorhydrin over a period of about one hour. The solution was diluted to 27% solids and advanced with an additional 0.1 ml. of epichlorohydrin over about one hour. The pH was then adjusted with 86% aqueous phosphoric acid to 3.7. The final viscosity at 25° C. was 710 centistokes at a concentration of 24.2% based on the weight of the cationic portion of the polyquaternary compound.

EXAMPLE 12

In order to demonstrate the improved efficiency in settling iron ore slimes, the following test procedure was employed:

One liter samples of the test slime are placed in a six-place laboratory stirrer and stirred at 100 r.p.m. for 1 minute. A predetermined amount of flocculant to be tested in 25 milliliters of deionixed water is then added to a sample. The sample is then stirred for 4 minutes at 100 r.p.m. As soon as the stirrer is turned off the times of the floc interface to settle 3 inches and 4 inches are recorded. After 15 minutes from cessation of stirring, turbidity of the supernatant liquid is determined by use of a Hellige Turbidimeter. The six-place stirrer enables six flocculants to be simultaneously tested.

Using this procedure, three flocculants were tested, each at two concentrations. Two of the flocculants were commercial products and represent comparative performances. Comparative Sample C is a cationic flocculant and is a polymer derived from diallyl dimethyl ammonium chloride. [Comparative Sample A is that of Comparative Example A above.] The product of the present invention evaluated is that of Example 2. Results are as follows:

| Flocculant and concentration (p.p.m.) | Turbidity (p.p.m.) | Setting time (seconds) |
|---|---|---|
| Comparative C: | | |
| 0.3 | 275 | 53 |
| 0.5 | 165 | 36 |
| [Comparative A] | | |
| [0.3 | 225 | 53] |
| [0.5 | 145 | 45] |
| Example 2: | | |
| 0.3 | 215 | 54 |
| 0.5 | 125 | 37 |

The results show that the product of the present invention results in less turbidity and therefore produces improved flocculation compared to the prior art flocculants.

EXAMPLE 13

In order to demonstrate the advantage of products of the present invention as filter aids in treating coal washings associated with processing bituminiuous coal, the following procedure was used:

To a 2-liter pail is added 1500 cc. of the coal washings under test, which comprise the effluent from initially flocculated washings. The effluent from the initial flocculation produces washings containing from 5% to 25% solids, which solids consist of about 40% fine bituminous coal and about 60% non-combustible inorganic mater such as clay and various silicates. An anionic flocculant, a copolymer of 70% acrylamide and 30% acrylic acid, is added as a 0.3% aqueous solution to provide 80 parts per million in the effluent under test. The effluent is then mixed for 1 minute to distribute the anionic flocculant therein and then filtered using a Dorr type 0.1 square foot filter leaf using a polypropylene cloth filter medium. Filtration time was for 35 seconds and drying of the cake was for 60 seconds. In conjunction with the filtration, the volume of filtrate was measured, as well as cake thickness and weight.

The above procedure was repeated except that after the anionic flocculant was mixed in the effluent under test, there was added in separate runs sufficient of the product of Example 2 as a 1% aqueous solution, by weight, based on the total weight of the polymer, to provide 100 and 150 parts per million in the effluent under test. Stirring to mix the polyquaternary flocculant is for an additional 30 seconds.

The results of the various tests are as follows:

| Run No. | Anionic flocculant, p.p.m. | Polyquaternary flocculant, p.p.m. | Filtrate volume, c.c. | Filter cake thickness, inch | Weight grams |
|---|---|---|---|---|---|
| 1 | 80 | 0 | 105 | 1/8 | 31.4 |
| 2 | 80 | 100 | 185 | 5/16 | 58.6 |
| 3 | 80 | 150 | 208 | 1/4 | 63.5 |

The results indicate the beneficial effects obtained by use of the products of the present invention as filter aids, resulting in larger cake formation and greater filtrate volume in a specified time period as compared to the normal use of anionic flocculant alone.

EXAMPLE 14

This example illustrates the advantages of the products of the present invention in raw water clarification.

Using a standard sludge contact clarifier raw water was treated with 50 parts per million of ferric chloride and 0.1 part per million of the anionic flocculant described in Example 13. The resulting effluent had a turbidity in excess of 10 parts per million expressed in Jackson turbidity units.

Replacing both the ferric chloride and the anionic flocculant by 5 parts per million of the product of Example 2 produced effluent having a turbidity less than 5 parts per million expressed in Jackson turbidity units.

Thus, the product of the present invention produced reduced turbidity at greatly reduced usage of additives. In addition, the clarifier was able to operate at an increase of 20% in flow rate while providing the above advantages.

EXAMPLE 15

This example illustrates the effectiveness of the products of the present invention as demulsifiers.

Using an American Petroleum Institute separator, an aqueous stream containing emulsified and suspended oil and suspended iron-containing solids was processed in the normal manner.

A similar trial was then made wherein prior to entry into the separator there was mixed sufficient of the product of Example 2 as a 1% aqueous solution to provide 5 parts per million in the stream being processed. Results of the runs are as follows:

| Product of Example 2, p.p.m. | Influent, p.p.m. | | | Effluent, p.p.m | |
|---|---|---|---|---|---|
| | pH | Oils | Solids | Oils | Solids |
| 0 | 4.3 | 560 | 427 | 540 | 427 |
| 5 | 4.2 | 271 | 1,291 | 112 | 50 |
| | 6.2 | 61 | 538 | 2 | 35 |
| | 8.2 | 88 | 650 | 15 | 45 |

In the above table, influent represents the stream prior to entering the separator and effluent represents the stream after exit from the separator. The results indicate the beneficial results in separation obtained with the product of the present invention. The results also show that the product of the present invention is beneficial at a wide range of pH values.

EXAMPLE 16

This example illustrates the advantages of products of the present invention in sludge dewatering.

In a standard sewage treatment plant operating at a flow rate of 205 gallons per minute, sludges containing a mixture of primary digested and waste activated solids were treated in separate runs with no additive and with various amounts of the products of Example 2. Results are as follows:

| Suspended solids in sludge (percent) | Product of Ex. 2 added (percent)[1] | Solids in effluent (percent) | Solids captured (percent) |
|---|---|---|---|
| 7.59 | 0 | 3.13 | 59 |
| 6.18 | 0.2 | 1.22 | 80 |
| 6.16 | 0.565 | 0.38 | 95 |
| 5.06 | 1.4 | 0.08 | 98 |

[1]Percent total polymer solids on weight of solids in sludge.

The results indicate the high increase in solids captured by use of the product of the present invention.

EXAMPLE 17

This example illustrates use of the products of this invention in air flotation sludge concentration.

Using standard air flotation units to concentrate activated sludge in sewage treatment, the following trials were made. In one run, the product of Comparative Example A was added as processing aid. In a second run the product of Example 2 was added as a processing aid.

The results and additive usage is given in the table which follows:

| | Product of comparative Ex. A | Product of Ex. 2 |
|---|---|---|
| Tons sludge processed | 57 | 55 |
| Pounds polymer added | 1,830 | 1,686 |
| Percent solids floated | 4.62 | 4.79 |

The above results show that the product of the present invention was more effective at lower polymer usage. The sludge was processed as 0.8% solids slurry and was concentrated during the air flotation.

What is claimed:

[1. A water-dispersible polyquaternary polymer of essentially linear structure consisting essentially of the difunctional reaction product of a lower dialkylamine and a difunctional epoxy compound selected from the group consisting of epihalohydrins, diepoxides, percursors of epihalohydrins and diepoxides which under alkaline conditions are readily converted into the corresponding epoxy compounds, and mixtures thereof, said polyquaternary polymer containing repeating units of

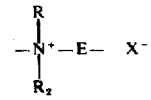

wherein R and $R_2$ are individually selected from the group consisting of alkyl of 1 to 3 carbon atoms; E is a residue obtained from said epoxy compound; the total amounts of reactants being substantially equimolar, the combination of which is such as to provide a polyquaternary compound which as a 37% aqueous solution, by weight, based on the cationic portion of said polyquaternary compound has a viscosity at 25° C. of at least 100 centistokes; and $X^-$ represents an ion forming the anionic portion of said polyquaternary.]

[2. The polymer of claim 1 wherein said E is the residue obtained from epichlorohydrin.]

[3. The polymer of claim 2 wherein both R and $R_2$ are methyl groups.]

[4. A water-dispersible polyquaternary polymer onsisting essentially of the reaction product of a lower ialkylamine, a polyfunctional amine, and a difunconal epoxy compound selected from the group consting of epihalohydrins, diepoxides, precursors of pihalohydrins and diepoxides which under alkaline onditions are readily converted into the correspondng epoxy compounds, and mixtures thereof, said polyuaternary of polymer containing repeating units of the tructures

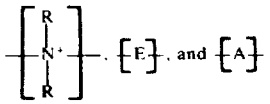

s the cationic portion, and $X^-$ as the anionic portion herein R and $R_2$ are individually selected from the roup consisting of alkyls of 1 to 3 carbon atoms: E is residue obtained from said epoxy compound; A is a esidue obtained after at least bifunctional epoxy reacion from a polyfunctional amine selected from the roup consisting of ammonia; primary amines; alkylene iamines of 2 to 6 carbon atoms; polyalkylenepolyaines of the structure

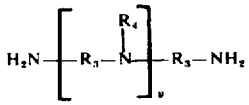

herein y represents an integer of about 1 to 5, $R_3$ is an lkylene radical of about 2 to 6 carbon atoms, and $R_4$ is elected from the group consisting of hydrogen, alkyl of bout 1 to 3 carbon atoms, and ω-aminoalkyl of about to 6 carbon atoms; a polyglycolamine of a structure uch as:

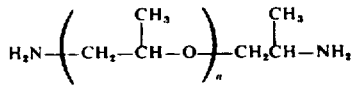

herein a is an integer of about 1 to 5; piperazine; eteroaromatic diamines of the structure

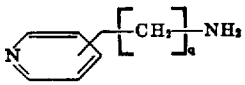

herein q is zero or an integer of about 1 to 3; and romatic diamines of the structure

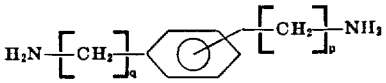

herein p and q are individually zero or an integer of bout 1 to 3; $X^-$ is an anion forming the anionic portion f said polyquaternary compound; the amount of said olyfunctional amine being up to about 15 mole percent of the total moles of said dialkylamine and said olyfunctional amine, the amount of said E is from at east that amount which is equimolar to the molar uantities of said amines up to the full functional equivalency of said amines, so as to provide a polyquaternary compound which as a 37% aqueous solution based on the cationic portion of said polyquaternary compound has a viscosity at 25° C. of at least 10 centistokes; and the amount of said ion present is such as to satisfy anion requirements of the cationic portion of said polyquaternary compound. ]

5. The polymer of claim [4] *27* wherein said polyamine is ethylenediamine and the amount thereof is between about 3 and 6 mole percent of the total amount of amines in the reaction.

6. The polymer of claim [4] *21* wherein said E is the residue obtained after bifunctional amine reaction from epichlorohydrin.

7. The polymer of claim [4] *21* wherein said A is the residue obtained after at least bifunctional exposy reaction from still bottoms resulting from purification of hexamethylenediamine.

8. The polymer of claim [4] *27* wherein said E is the residue obtained after bifunctional amine reaction from 1,4-butanediol-diglycidyl ether.

[9. The polymer of claim 1 wherein said viscosity is 235 centistokes.]

10. The polymer of claim [4] *21* wherein said viscosity is 800 centistokes.

11. The polymer of claim [4] *21* wherein said A is the residue obtained after at least bifunctional epoxy reaction from still bottoms resulting from purification of ethylenediamine.

[12. A process for preparing a polyquaternary compound from a secondary amine selected from dialkylamines wherein the alkyl groups are individually selected from those containing about 1 to 3 carbon atoms and an epoxy compound selected from the group consisting of epihalohydrins, diepoxides, precursors for epihalohydrins and diepoxides which under alkaline conditions are readily converted into corresponding epoxy compounds, and mixtures thereof; which process comprises the steps of (1) preparing an aqueous reaction mixture of one of said reactants, the amount of water therein being from about 10% to about 55%, by weight, based on the total weight of reactants and water; (2) adding the other of said reactants to the reaction mixture at a rate which maintains the reaction mixture at a temperature in the range of about 20 to 70° C., the total amounts of said reactants employed being substantially equimolar; (3) heating the reaction mixture at a temperature in the range of about 40 to 70° C. for a time period sufficient to obtain a polyquaternary compound which as a 37% aqueous solution, by weight, based on the total weight of the cationic portion of said polyquaternary has a viscosity at 25° C. of at least 100 centipoises; and thereafter recovering the polyquaternary compound thus formed. ]

[13. The process of claim 12 wherein said reactants are dimethylamine and epichlorohydrin. ]

[14. The process of claim 13 wherein said viscosity is 235 centistokes. ]

[15. The process of 13 wherein the amount of water is about 18%, by weight, based on the total weight of reactants and water. ]

[16. A process for preparing a polyquaternary compound from a first reactant selected from the group consisting of dialkylamines wherein the alkyl groups are individually selected from those containing 1 to 3 carbon atoms; a second reactant selected from the group consisting of ammonia, primary amines, alkylenediamines of about 2 to 6 carbon atoms, polyamines of the structure:

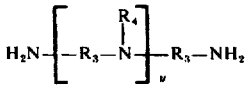

wherein y represents an integer of about 1 to 5, $R_3$ is an alkylene of about 2 to 6 carbon atoms, and $R_4$ is selected from the group consisting of hydrogen, alkyl of about 1 to 3 carbon atoms, and ω-aminoalkyls of about 2 to 6 carbon atoms, piperazine, heteroaromatic diamines of the structure

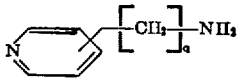

wherein q is zero or an integer of about 1 to 3, and aromatic diamines of the structure

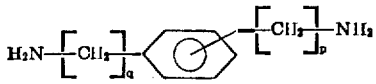

wherein p and q are individually zero or an integer of about 1 to 3; and a third reactant selected from the group consisting of epihalohydrins, diepoxides, precursors which under alkaline conditions are readily converted into corresponding epoxy compounds, and mixtures thereof, the molar quantity of said second reactant being up to 15% of the total molar quantity of said first and second reactants, and the molar quantity of said third reactant, being an amount which ranges from substantially equimolar to the total molar quantity of amines employed to substantially equal to the total functionality requirements of the amines: which process comprises (a) forming an aqueous reaction mixture of said reactants while maintaining the reaction mixture at a temperature in the range of about 20° C. to about 100° C., the amount of water in said mixture being from about 10% to 55%, by weight, based on the total weight of reactants and water: (b) maintaining said reaction mixture at a temperature in the range of about 50 to 100° C. until a polyquaternary compound is obtained which as a 37% aqueous solutiton, by weight, based on the total weight of the cationic portion of said polyquaternary compound has a viscosity of at least 10 centistokes; and thereafter recovering said polyquaternary compound.]

17. The process of claim [16] *29* wherein in step (a) the amount of said third reactant added is substantially equal to the total molar amounts of amines employed.

18. The process of claim 17 wherein subsequent to step (b) and prior to recovery of said polyquaternary compound, an added amount of said third reactant is added and the reaction mixture maintained at a temperature in the range of 50 to 100° C. until a polyquaternary compound is again obtained which as a 37% aqueous solution, by weight, based on the total weight of the cationic portion of said polyquaternary compound has a viscosity at 25° C. of at least [10] *100* centistokes.

19. The process of claim 18 wherein in step (a) both the first and second reactants are in the aqueous reaction mixture and said third reactant is added thereto.

20. The process of claim 18 wherein said first reactant is present in said aqueous reaction mixture, said third reactant is added thereto at a rate which maintains the temperature in the range of 50 to 70° C. and upon completion of addition of said third reactant reaction is allowed to proceed at a temperature in the range of 50 to 70° C. until from about 50% to about 80% of the reaction potential of said first and said third reactants has been achieved and then adding said second reactant to the reactant mixture thus formed.

*21. A water dispersible polyquaternary polymer consisting essentially of the reaction product of dimethylamine, a polyfunctional amine, and a polyfunctional epoxy compound selected from the group consisting of epihalohydrins and precursors of epihalohydrins which under alkaline conditions are readily converted into the corresponding epoxy compounds, and mixtures thereof, said polyquaternary polymer containing repeating units of the structures*

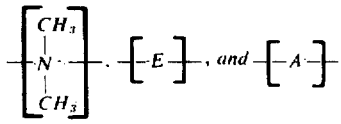

*as the cationic portion, and $X^-$ as the anionic portion, wherein E is a residue obtained from said epoxy compound; A is a residue obtained after at least bifunctional epoxy reaction from a polyfunctional amine selected rom the group consisting of ammonia; primary amines; alkylene diamines of 2 to 6 carbon atoms; polyalkylenepolyamines of the structure*

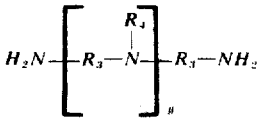

*wherein y represents an integer of about 1 to 5, $R_3$ is an alkylene radical of about 2 to 6 carbon atoms, and $R_4$ is selected from the group consisting of hydrogen, alkyl of about 1 to 3 carbon atoms, and ω-aminoalkyl of about 2 to 6 carbon atoms; a polyglycolamine of a structure such as:*

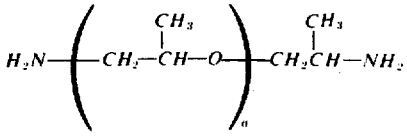

*wherein a is an integer of about 1 to 5; piperazine; heteroaromatic diamines of the structure*

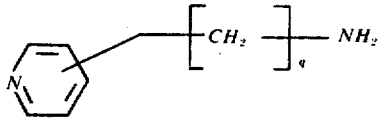

*wherein q is zero or an integer of about 1 to 3; and aromatic diamines of the structure*

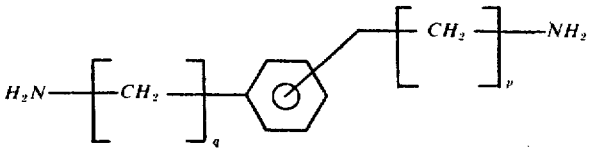

'herein p and q are individually zero or an integer of bout 1 to 3; $X^-$ is an anion forming the anionic portion f said polyquaternary compound; the amount of said olyfunctional amine being up to about 15 mole percent f the total moles of said dialkylamine and said polyfunconal amine, the amount of said E is from at least that mount which is substantially equimolar to the molar uantities of said amines up to the full functional equiva-ncy of said amines, so as to provide a polyquaternary ompound which as a 37% aqueous solution based on the ationic portion of said polyquaternary compound has a iscosity at 25°C. of at least 100 centistokes; and the mount of said ion present is such as to satisfy anion equirement of the cationic portion of said polyquaterary compound.

22. The polymer of claim 21 wherein said viscosity is at ast 200 centistokes.

23. The polymer of claim 21 wherein said viscosity is 00–17,000 centistokes.

24. The polymer of claim 21 wherein said dialkylamine dimethylamine, said polyfunctional amine is ethyleneiamine, and said difunctional epoxy compound is epihlorohydrin.

25. The polymer of claim 24 wherein said viscosity is at ast 200 centistokes.

26. The polymer of claim 24 wherein said viscosity is 00 to 17,000 centistokes.

27. A water-dispersible polyquaternary polymer conisting essentially of the reaction product of a lower dialklamine, a polyfunctional amine, and a polyfunctional poxy compound selected from the group consisting of iepoxides and precursors of diepoxides which under lkaline conditions are readily converted into the correponding epoxy compounds, and mixtures thereof, said olyquaternary polymer containing repeating units of the tructures

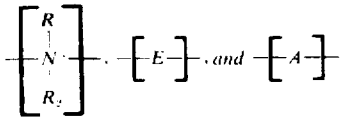

is the cationic portion, and $X^-$ as the anionic portion herein R and $R_2$ are individually selected from the roup consisting of alkyls of 1 to 3 carbon atoms; E is a esidue obtained from said epoxy compound; A is a resilue obtained after at least bifunctional epoxy reaction rom a polyfunctional amine selected from the group onsisting of ammonia; primary amines; alkylenediaines of 2 to 6 carbon atoms; polyalkylenepolyamines of he structure

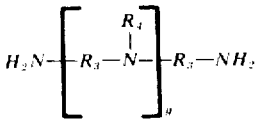

herein y represents an integer of about 1 to 5, $R_3$ is an lkylene radical of about 2 to 6 carbon atoms, and $R_4$ is elected from the group consisting of hydrogen, alkyl of bout 1 to 3 carbon atoms, and ω-aminoalkyl of about to 6 carbon atoms; a polyglycolamine of a structure uch as:

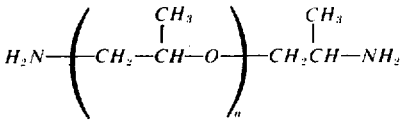

wherein a is an integer of about 1 to 5; piperazine; heteroaromatic diamines of the structure

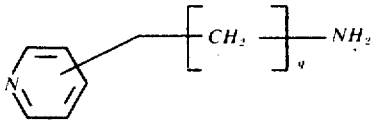

wherein q is zero or an integer of about 1 to 3; and aromatic diamines of the structure

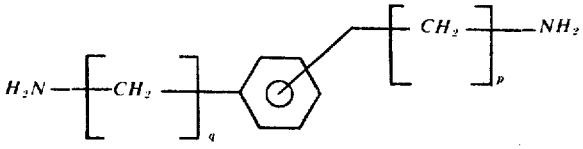

wherein p and q are individually zero or an integer of about 1 to 3; $X^-$ is an anion forming the anionic portion of said polyquaternary compound; the amount of said polyfunctional amine being up to about 15 mole percent of the total moles of said dialkylamine and said polyfunctional amine, the amount of said E is from at least that amount which is substantially equimolar to the molar quantities of said amines up to the full functional equivalency of said amines, so as to provide a polyquaternary compound which as a 37% aqueous solution based on the cationic portion of said polyquaternary compound has a viscosity at 25°C. of at least 100 centistokes; and the amount of said ion present is such as to satisfy anion requirements of the cationic portion of said polyquaternary compound.

28. A process for preparing a polyquaternary compound from a first reactant selected from the group consisting of dialkylamines wherein the alkyl groups are individually selected from those containing 1 to 3 carbon atoms; a second reactant selected from the group consisting of ammonia, primary amines, alkylenediamines of about 2 to 6 carbon atoms, polyamines of the structure:

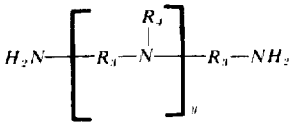

wherein y represents an integer of about 1 to 5, $R_3$ is an alkylene of about 2 to 6 carbon atoms, and $R_4$ is selected from the group consisting of hydrogen, alkyl of about 1 to 3 carbon atoms, and ω-aminoalkyls of about 2 to 6 carbon atoms, piperazine, heteroaromatic diamines of the structure

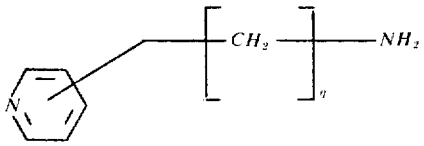

*wherein q is zero or an integer of about 1 to 3, and aromatic diamines of the structure*

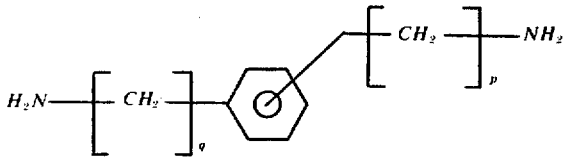

*wherein p and q are individually zero or an integer of about 1 to 3; and a third reactant selected from the group consisting of diepoxides and precursors of diepoxides which under alkaline conditions are readily converted into corresponding epoxy compounds, and mixtures thereof, the molar quantity of said second reactant being up to 15% of the total molar quantity of said first and said second reactants, and the molar quantity of said third reactant, being an amount which ranges from substantially equimolar to the total molar quantity of amines employed to substantially equal to the total functionality requirement of the amines: which process comprises (a) forming an aqueous reaction mixture of said reactants while maintaining the reaction mixture at a temperature in the range of about 20°C. to about 100°C., the amount of water in said mixture being from about 10% to 55%, by weight, based on the total weight of reactants and water; (b) maintaining said reaction mixture at a temperature in the range of about 50° to 100°C. until a polyquaternary compound is obtained which as a 37% aqueous solution, by weight, based on the total weight of the cationic portion of said polyquaternary compound has a viscosity of at least 100 centistokes; and thereafter recovering said polyquaternary compound.*

*29. A process for preparing a polyquaternary compound from a first reactant dimethylamine; a second reactant selected from the group consisting of ammonia, primary amines, alkylenediamines of about 2 to 6 carbon atoms, polyamines of the structure:*

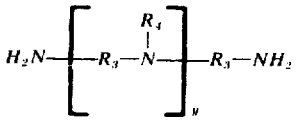

*wherein y represents an integer of about 1 to 5, $R_3$ is an alkylene of about 2 to 6 carbon atoms, and $R_4$ is selected from the group consisting of hydrogen, alkyl of about 1 to 3 carbon atoms, and ω-aminoalkyls of about 2 to 6 carbon atoms, piperazine, heteroaromatic diamines of the structure.*

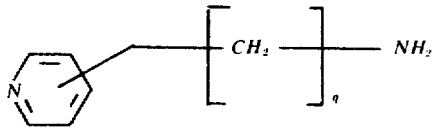

*wherein q is zero or an integer of about 1 to 3, and aromatic diamines of the structure*

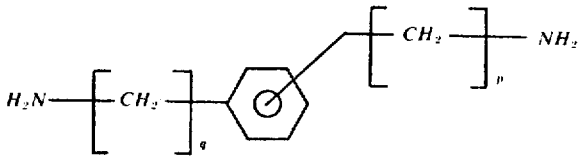

*wherein p and q are individually zero or an integer of about 1 to 3; and a third reactant selected from the group consisting of epihalohydrins and precursors of epihalohydrins which under alkaline conditions are readily converted into corresponding epoxy compounds, and mixtures thereof, the molar quantity of said second reactant being up to 15% of the total molar quantity of said first and said second reactants, and the molar quantity of said third reactant, being an amount which ranges from substantially equimolar to the total molar quantity of amines employed to substantially equal to the total functionality requirements of the amines: which process comprises (a) forming an aqueous reaction mixture of said reactants while maintaining the reaction mixture at a temperature in the range of about 20°C. to about 100°C., the amount of water in said mixture being from about 10% to 55%, by weight, based on the total weight of reactants and water; (b) maintaining said reaction mixture at a temperature in the range of about 50° to 100°C. until a polyquaternary compound is obtained which as a 37% aqueous solution, by weight, based on the total weight of the cationic portion of said polyquaternary compound has a viscosity of at least 100 centistokes; and thereafter recovering said polyquaternary compound.*

* * * * *